United States Patent
Chuang

(10) Patent No.: US 8,402,989 B2
(45) Date of Patent: Mar. 26, 2013

(54) TELESCOPIC PUMP NOZZLE ADAPTED FOR ENGAGING WITH DIFFERENT TIRE VALVES FOR TIRE INFLATION

(76) Inventor: Louis Chuang, Taichung (TW)

(*) Notice: Subject to any disclaimer, the term of this patent is extended or adjusted under 35 U.S.C. 154(b) by 320 days.

(21) Appl. No.: 12/948,891

(22) Filed: Nov. 18, 2010

(65) Prior Publication Data

US 2012/0125446 A1   May 24, 2012

(51) Int. Cl.
*F16K 15/20* (2006.01)
(52) U.S. Cl. ........................ 137/231; 137/223
(58) Field of Classification Search .............. 137/231, 137/270, 223; 251/149.1, 149.4
See application file for complete search history.

(56) References Cited

U.S. PATENT DOCUMENTS

| | | | |
|---|---|---|---|
| 6,260,572 B1 * | 7/2001 | Wu | 137/231 |
| 6,382,268 B1 * | 5/2002 | Lin | 141/67 |
| 6,904,932 B1 * | 6/2005 | Haraughty | 137/231 |
| 6,978,796 B2 * | 12/2005 | Ostrowiecki | 137/231 |
| 8,297,301 B2 * | 10/2012 | Wu | 137/231 |
| 2004/0250852 A1 * | 12/2004 | Shipman | 137/231 |
| 2007/0215636 A1 * | 9/2007 | Chuang | 222/3 |

FOREIGN PATENT DOCUMENTS

| | | |
|---|---|---|
| TW | 348809 | 12/1998 |
| TW | M375132 U1 | 3/2010 |

* cited by examiner

*Primary Examiner* — John Rivell
*Assistant Examiner* — Michael R Reid
(74) *Attorney, Agent, or Firm* — Alan Kamrath; Kamrath IP Lawfirm, P.A.

(57) ABSTRACT

A telescopic pump nozzle for a pump includes a shaft having a first end and a second end, a channel formed therein and communicating the first end with the second end, and a threadedly coupled portion defined at the first end, and in addition, the second end is coupled to an air pipe of the pump. A tube has a first end and a second end and includes first and second connected sections formed on the inner wall of the first end, a compartment defined in the second end, and at least one O-ring mounted on the shaft and abutted against the inner wall of the compartment in an air-tight manner. The second connected section is provided between the first connected section and the compartment. The shaft is slideably disposed in the compartment of the tube. The threadedly coupled portion is selectively coupled to the second connected section.

15 Claims, 12 Drawing Sheets

__TELESCOPIC PUMP NOZZLE ADAPTED FOR ENGAGING WITH DIFFERENT TIRE VALVES FOR TIRE INFLATION__

BACKGROUND OF THE INVENTION

1. Field of the Invention

The present invention relates to a pump nozzle for bicycle tires, and more particularly to a telescopic pump nozzle adapted for engaging with different tire valves.

2. Description of the Related Art

Referring to Taiwan Patent No. 348809, it discloses a conventional pump nozzle adapted for engaging with American and French valves and includes a tube having two openings that receive two different nozzle plugs respectively, two related nozzles installed to the nozzle plugs respectively and two disc coverings to close the two openings. The two openings are adapted for engaging with an American valve and a French valve respectively so it's required two channels and a switch device to be provided in the conventional pump nozzle. However, the conventional pump nozzle would have a complex structure and it results in high production cost. Further, the conventional pump nozzle is of large volume such that it's easy to fall down to be broken or leak.

Referring to Taiwan Patent No. M375132, it discloses a conventional nozzle for a bicycle pump. The conventional nozzle includes a first connecting end, a second connecting end and a locking member. The first and second connecting ends are provided at two ends of the nozzle for respectively engaging with French and American valves. The locking member is provided in the second connecting end and engages with the first connecting end. In use, while inflating a tire with a French valve in a first position of the nozzle, the first connecting end is coupled to the French valve and the second connecting end is joined to the head of a pump pipe. On the other hand, while inflating a tire with an American valve in a second position of the nozzle, the nozzle is reversed from the first position so that the second connecting end is coupled to the American valve and the first connecting end is joined the head of the pump pipe. The volume of this conventional nozzle is reduced, however, a user has to reverse the nozzle and connect the two different valves to the corresponding connecting ends for inflating tires that have different valves. It's still a complicated operation for inflating tires that have different valves.

SUMMARY OF THE INVENTION

According to the present invention, a telescopic pump nozzle for a pump is adapted to engage with American/French valves that are usable in tires for tire inflation and includes a shaft and a tube mounted on the shaft. The tube includes first and second connected sections and a compartment and can be switched between first and second positions.

One objective of the present invention is that the shaft is slideably disposed in the compartment of the tube and is selectively engaged with the second connected section, which enables the telescopic pump nozzle to be suitable for American/French valves and the tube to be switchable quickly between the first and second positions. The pump is simple-structure and it can reduce a volume of a head of the pump.

Another objective of the present invention is that the pump nozzle is adapted to be easily extended-retracted with respect to the pump to make the tube switchable between the first and second positions for American/French valves without additional switch device. It can reduce manufacture cost effectively.

DETAILED DESCRIPTION OF THE PREFERRED EMBODIMENTS

Figure 1:
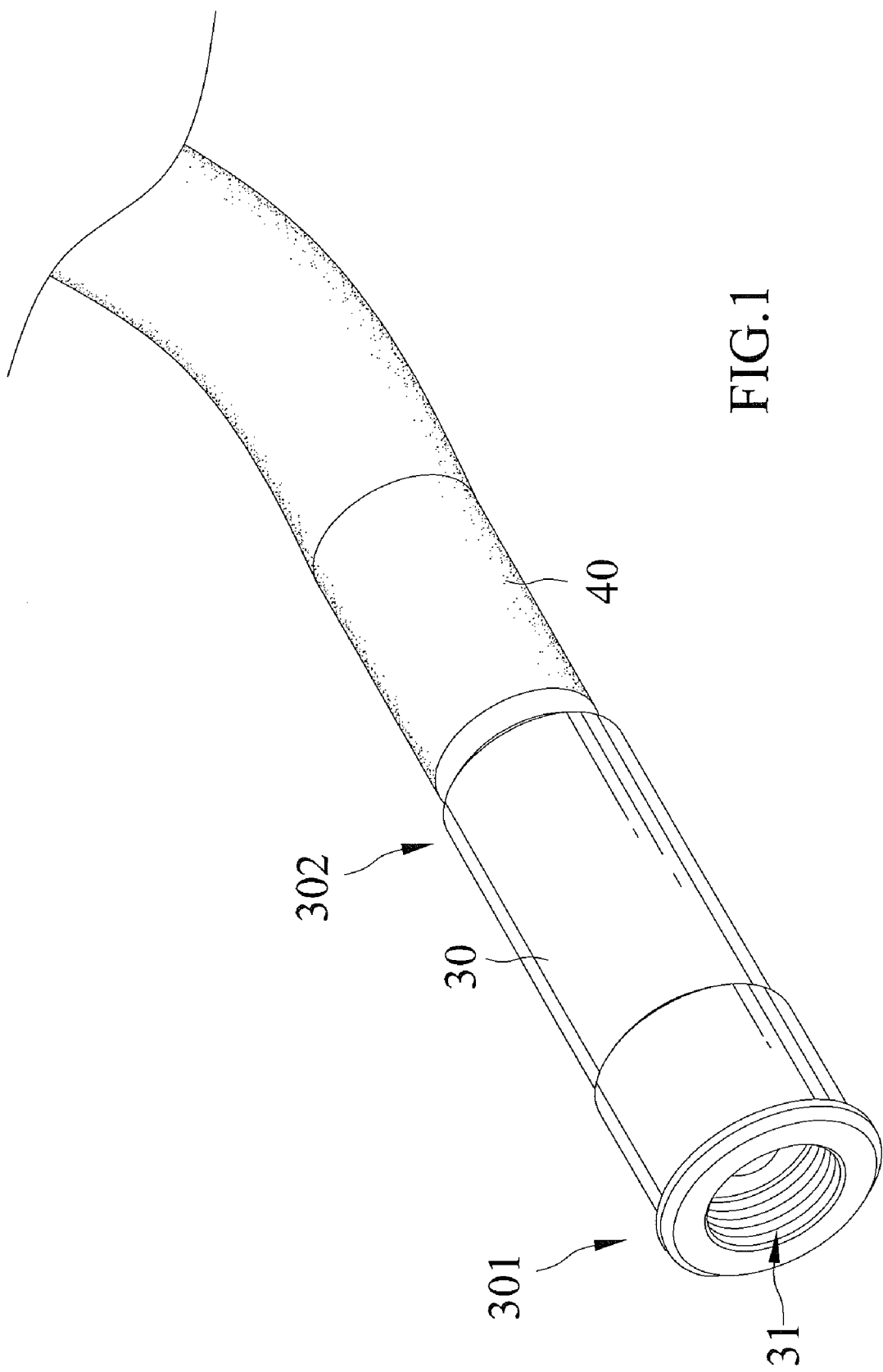
FIG. 1 is a perspective view of a telescopic pump nozzle according to a first embodiment of the present invention.
Figure 2:
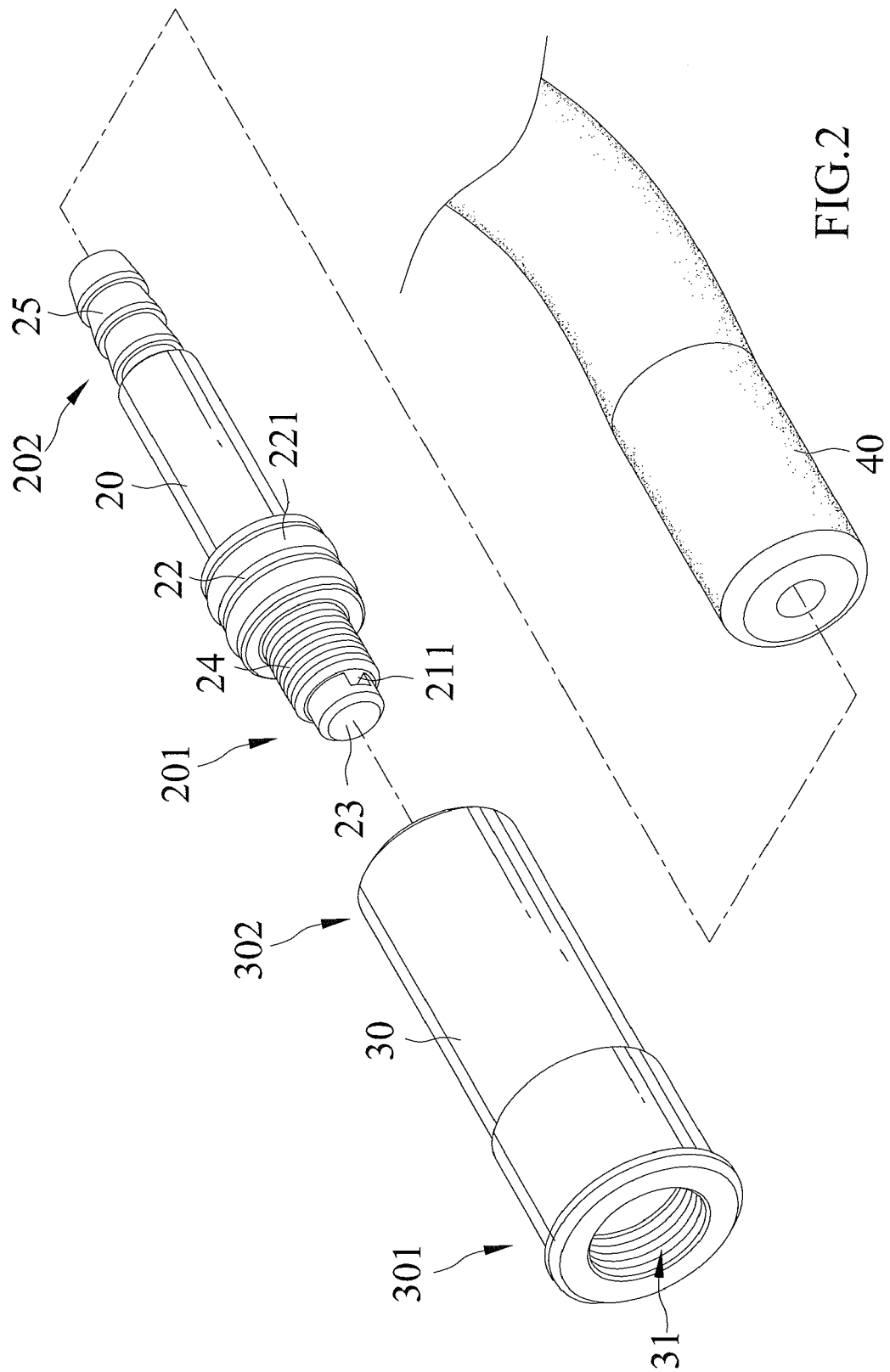
FIG. 2 is an exploded, perspective view of the pump nozzle as shown in FIG. 1.

FIGS. 1 through 6 show a telescopic pump nozzle in accordance with a first embodiment of the present invention. The telescopic pump nozzle is adapted for engaging with American and/or French valves that are usable in bicycle tires for inflating bicycle tires. The telescopic pump nozzle includes a shaft 20 including a first end 201 and a second end 202, and a tube 30. The second end 202 of the shaft 20 is inserted into an air pipe 40 of a pump. The tube 30 is mounted on the shaft 20 and is selectively engaged with the first end 201 of the shaft 20. The air pipe 40 is preferably a flexible hose. The tube 30 is adapted to engage with tire valves.

The shaft 20 further includes a channel 21 formed therein and communicating the first end 201 with the second end 202. A through-hole 211 is formed transversely at the first end 201 and communicates with the exterior of the first end 201. A slider 22 is provided on the outer periphery of the shaft 20 and between the first end 201 and the second end 202. Two O-rings 221 are mounted on the slider 22.

A pusher 23 is defined at the top of the first end 201 and is opposite to the second end 202 and is adapted to push needles of the tire valves for tire inflation. A threadedly coupled portion 24 is formed on the first end 201 and is between the pusher 23 and the slider 22. A plug 25 is defined at the second end 202 for inserting into the air pipe 40. The channel 21 communicates the interior of the plug 25 with the air pipe 40.

The tube 30 is mounted on the shaft 20 and has a first end 301 and a second end 302. A first connected section 31, an annular section 33 and a second connected section 32 are contiguously formed on the inner side of the first end 301. The annular section 33, in this case, is preferably concave and is defined between the first and second connected sections 31, 32 which both have inner threads. The first connected section 31 is abutted against the distal end of the first end 301 and is suitable for engaging with threads of the American valve. In the other hand, the second connected section 32 is adjacent to the second end 302 and is suitable for engaging with threads of the French valve. A diameter of the second connected section 32 is smaller with that of the first connected section 31 and that of the annular section 33. A seal 331 is provided at the annular section 33 and abuts against the tire valves in an air-tight manner while the tube 30 is engaged with the tire valves. A threadedly connected portion 303 is defined on the second connected section 32 and is adapted to engage with the threadedly coupled portion 24 or the French valve selectively.

A compartment 34 is provided at the interior of the second end 302 and communicates the first connected section 31 with the second connected section 32 axially. The second connected section 32 is intermediate between the first connected section 31 and the compartment 34. A diameter of the compartment 34 is larger than that of the second connected section 32 and a blocked flange 341 is formed between the compartment 34 and the second connected section 32. A recess 342 is annularly formed on the inner wall of an end of the compartment 34 and is opposite to the second connected section 32. An anti-detach ring 35 is provided at the recess 342.

The slider 22 of the shaft 20 is slideably disposed in the compartment 34 of the tube 30, and the O-rings 221 mounted on the slider 22 are abutted against the inner wall of the compartment 34 in the air-tight manner for preventing air-leak between the shaft 20 and the tube 30. The slider 22 can be selectively blocked by the anti-detach ring 35 for preventing the shaft 20 detaching from the second end 302 of the tube 30.

Figure 3:
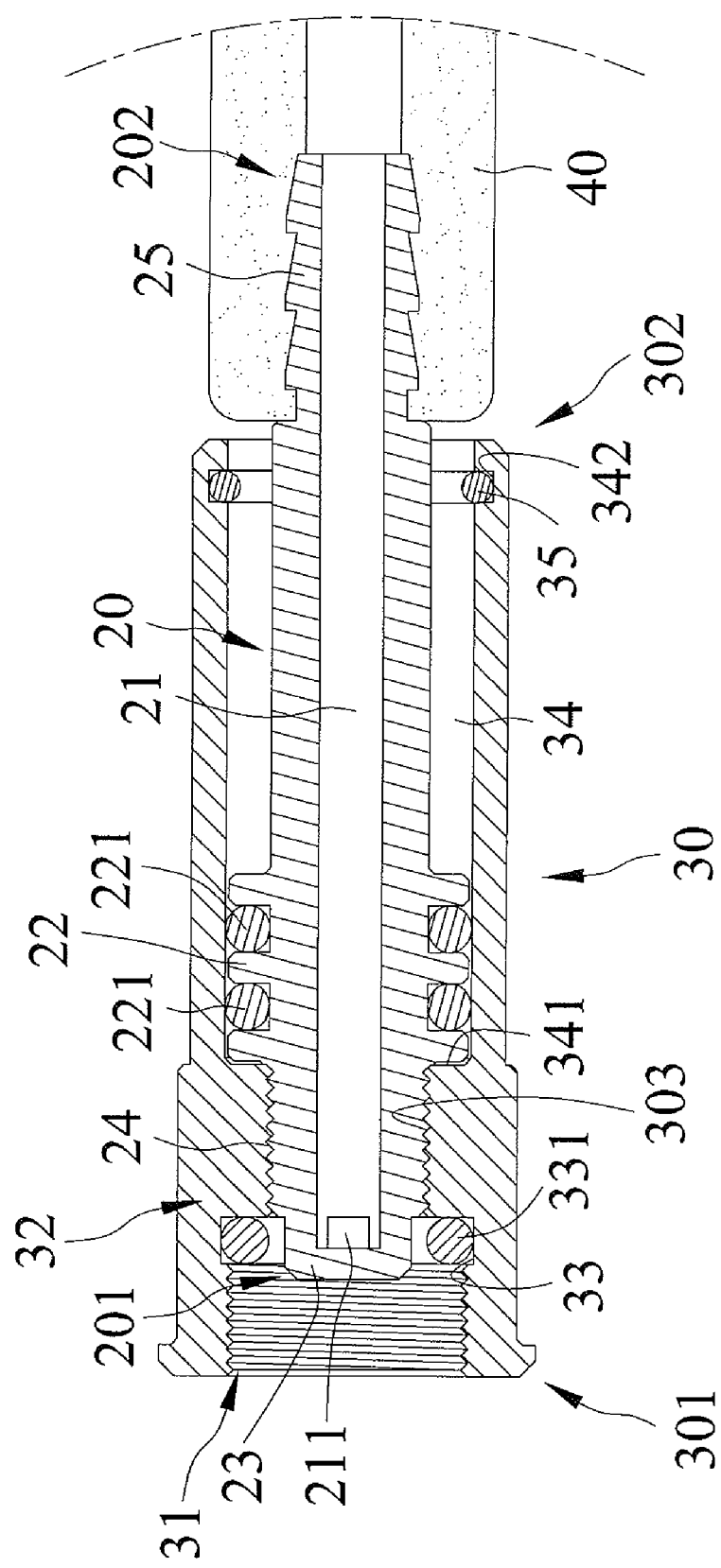
FIG. 3 is a cross-sectional view of the pump nozzle as shown in FIG. 1.
Figure 4:
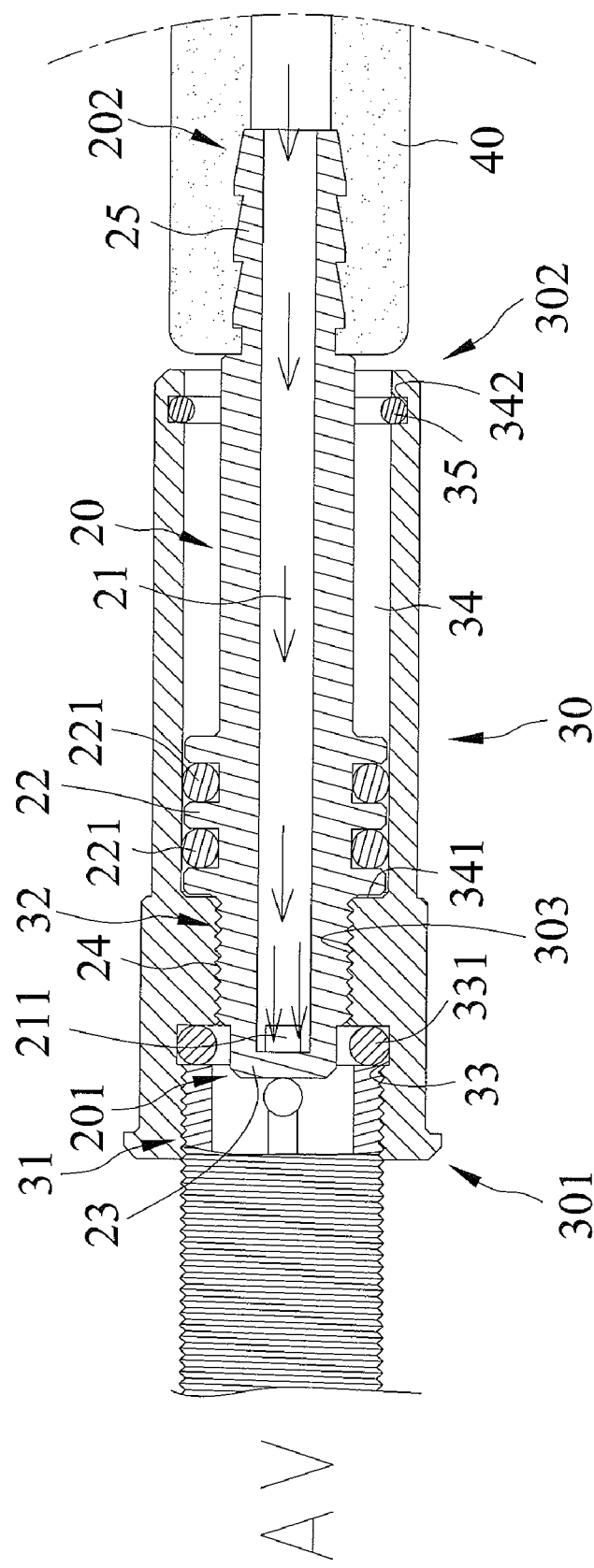
FIG. 4 is a cross-sectional view similar to FIG. 3, but illustrates the pump nozzle engaged with an American valve for inflating.

Referring to FIGS. 3 and 4, while the tube 30 is in a first position, the threadedly connected portion 303, which is defined on the second connected section 32, is engaged with the threadedly coupled portion 24, and in addition, the blocked flange 341 blocks the slider 22. For inflating a tire with an American valve (as shown in FIG. 4), threads of the American valve are engaged with the first connected section 31 of the tube 30 firstly so that the outer periphery of the American valve is abutted against the seal 331, and then the threadedly coupled portion 24 is engaged with the threadedly connected portion 303 by rotating the pump. Hence, the pusher 23 biases a needle of the American valve at the first connected section 31 and air can be pumped into the tire by the American valve through the through-hole 211 from the channel 21 which communicates with the air pipe 40.

Figure 5:
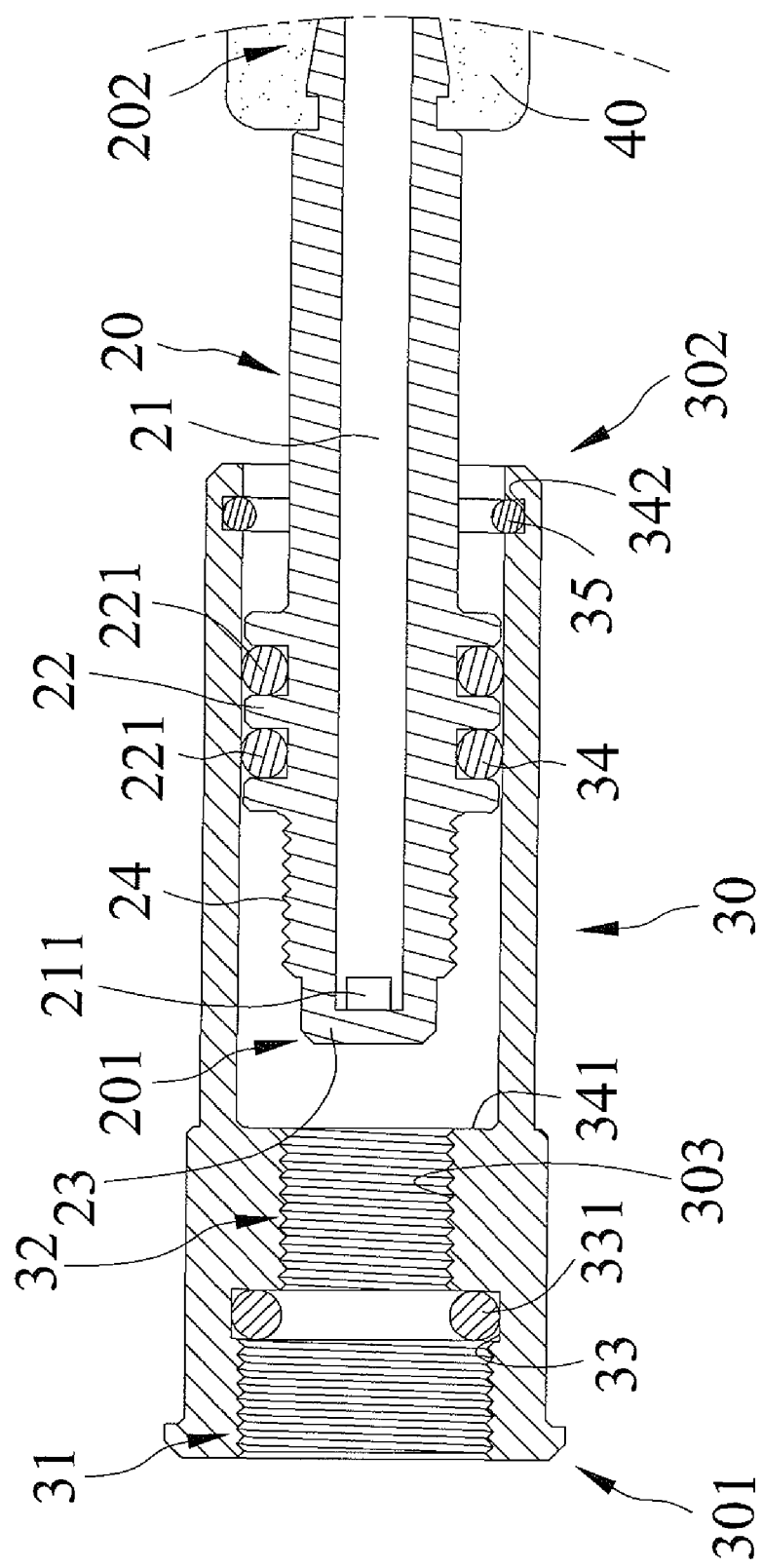
FIG. 5 is a cross-sectional view similar to FIG. 3, but illustrates the tube extended outward with respect to the shaft.
Figure 6:
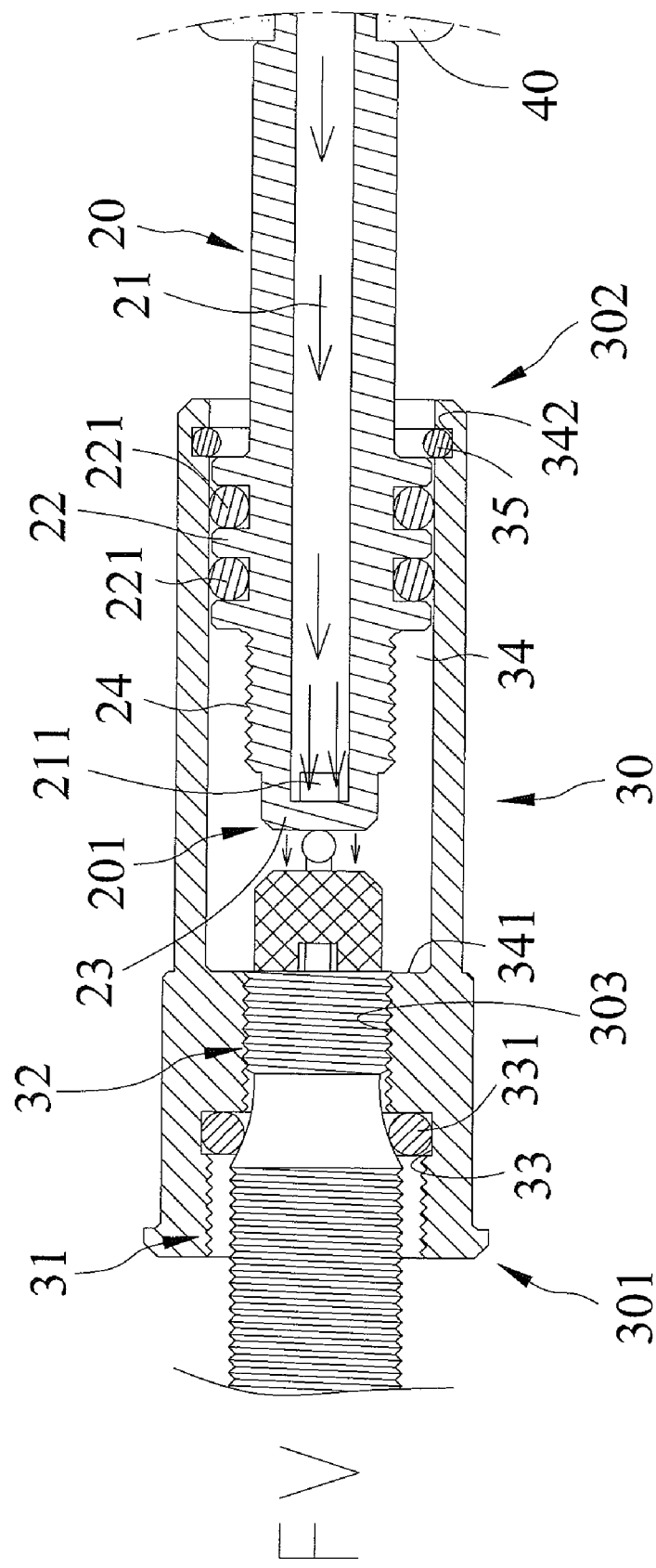
FIG. 6 is a cross-sectional view similar to FIG. 3, but illustrates the pump nozzle engaged with a French valve for inflating.
Figure 7:
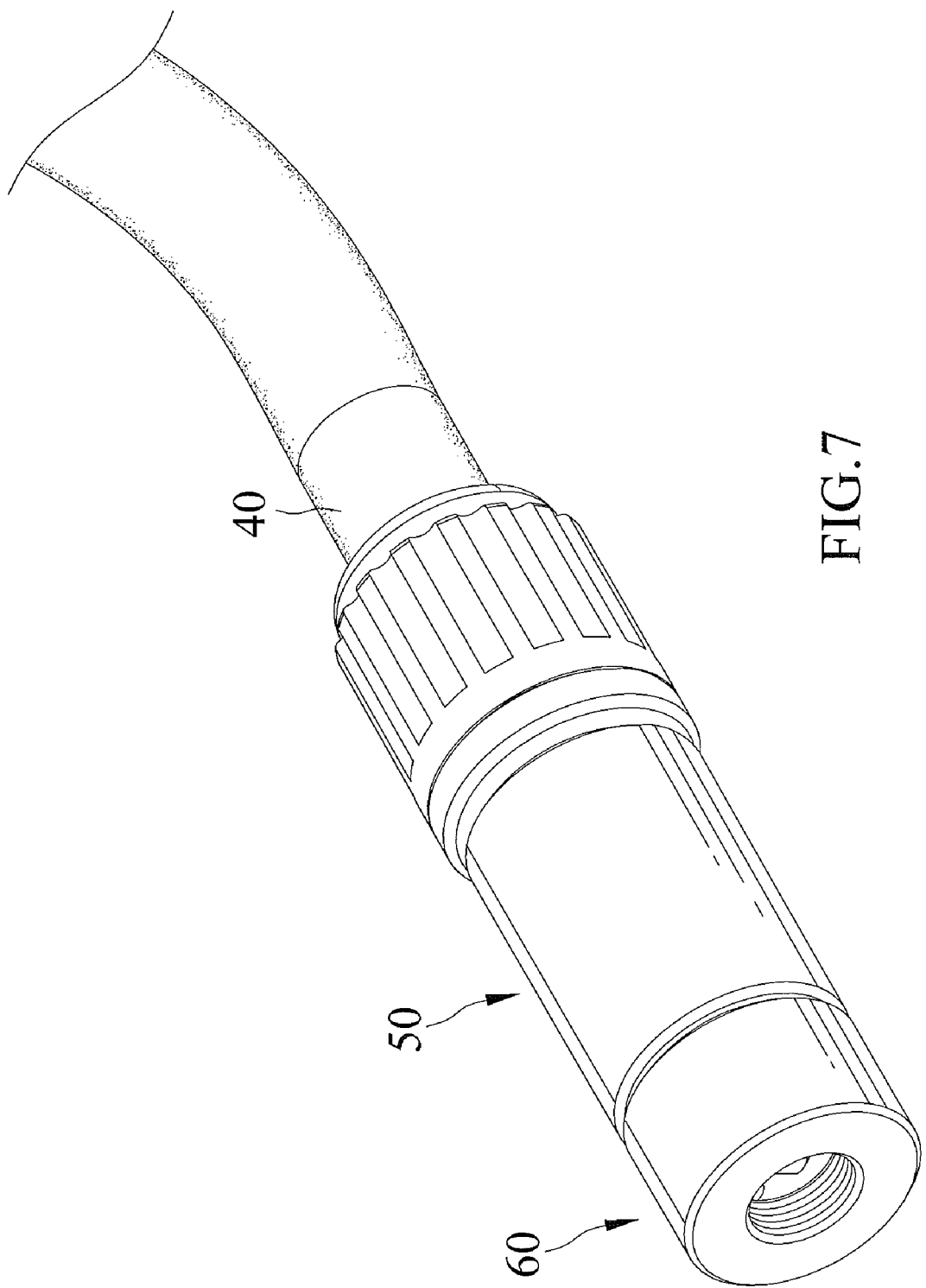
FIG. 7 is a perspective view of a telescopic pump nozzle according to a second embodiment of the present invention.
Figure 8:
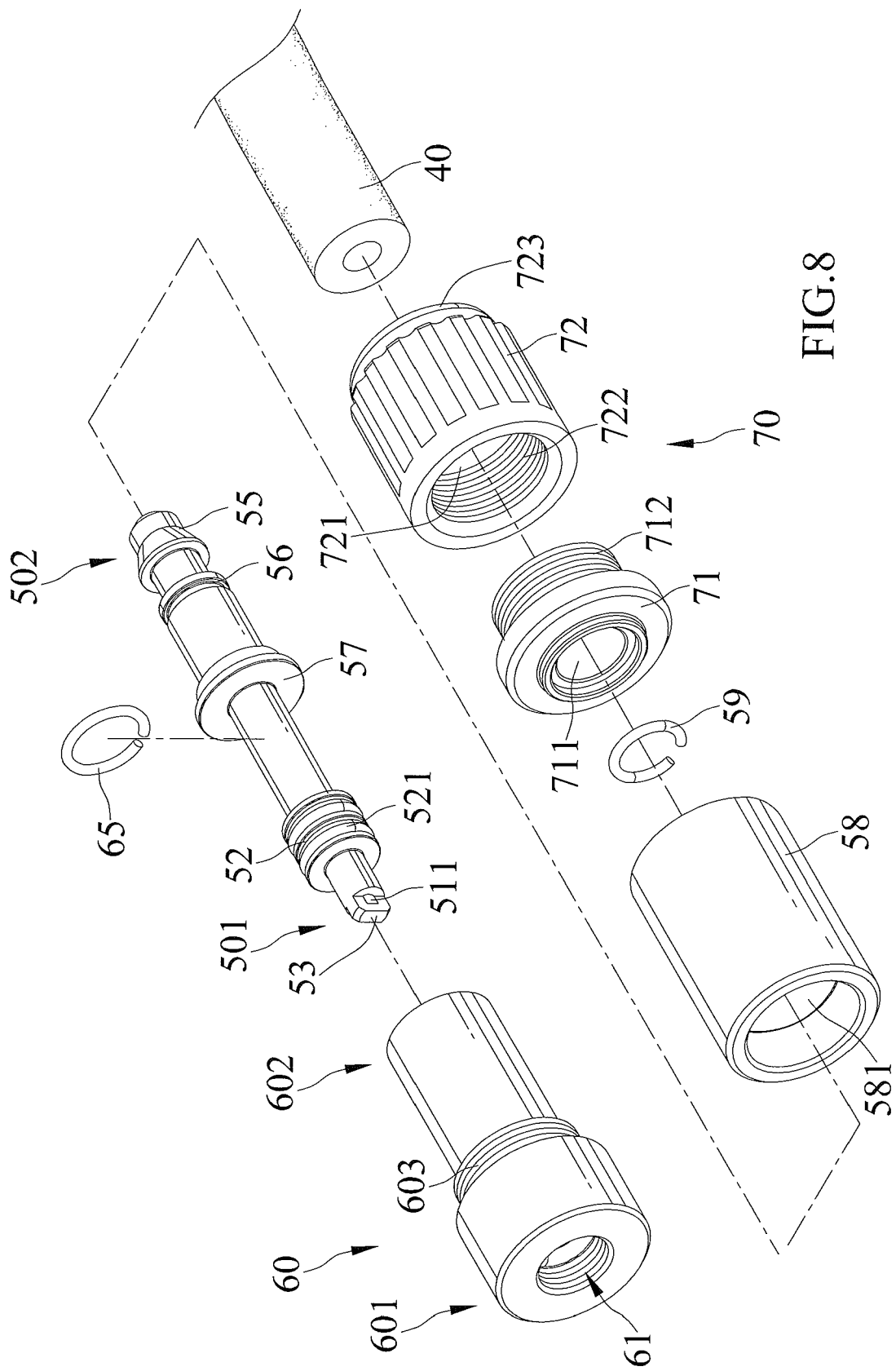
FIG. 8 is an exploded, perspective view of the pump nozzle as shown in FIG. 7.

Referring to FIGS. 5 and 6, while the tube 30 is in a second position, threadedly connected portion 303 is disengaged from the threadedly coupled portion 24 and the tube 30 is able to slide with respect to the shaft 20 axially. The slider 22 can be blocked by the anti-detach ring 35. For inflating a tire with a French valve (as shown in FIG. 6), threads of the French valve are engaged with the threadedly connected portion 303 firstly and the neck (not numbered) of the French valve is abutted against the seal 331 and coupled to the first end 301 in the air-tight manner. Then, the pusher 23 biases a needle of the French valve at the first connected section 31 and air can be pumped into the tire by the French valve through the through-hole 211 from the channel 21 which communicates with the air pipe 40.

FIGS. 7 through 12 show a telescopic pump nozzle in accordance with a second embodiment of the present invention, which is similar to the first embodiment except for several features as detailed below.

The telescopic pump nozzle includes a shaft 50 including a first end 501 and a second end 502, a tube 60 and a joint member 70. The second end 502 of the shaft 50 is inserted into the air pipe 40, and in addition, the tube 60 is coupled to the shaft 50 and selectively extends from/retracts into the shaft 50. The tube 60 is adapted to engage with tire valves.

The shaft 50 is similar to the shaft 20 and includes a channel 51, a through-hole 511, a slider 52, two O-rings 521, a pusher 53, a plug 55 defined at the second end 502 for inserting into the air pipe 40. However, the shaft 50 further includes a blocked flange 57 provided on the outer periphery thereof and disposed between the first and second ends 501, 502, and a sleeve 58 mounted on the shaft 50 and extending from the blocked flange 57 towards the first end 501. The sleeve 58 includes a through-hole 581 into which part of the shaft 50 is inserted, and a clamping end 582 defined at an end thereof and blocking the blocked flange 57 for coupling the sleeve 58 to the shaft 50. A threadedly coupled portion 54 is formed on the inner wall of another end of the sleeve 58 and is opposite to the clamping end 582 with respect to the pusher 53.

The tube 60 includes first and second ends 601, 602 and is similar to the tube 30 and includes first and second connected sections 61, 62, an annular section 63, a seal 631, a compartment 64, a recess 642 and an anti-detach ring 65.

However, a diameter of the first end 601 is larger than that of the second end 602 and a threadedly connected portion 603 is defined on the outer periphery of a connection of the first and second ends 601, 602 and is adapted to selectively engage with the threadedly coupled portion 54. The second connected section 62 is adapted to engage with the French valve selectively.

The slider 52 is slideably disposed in the compartment 64 of the tube 60, and the O-rings 521 mounted on the slider 52 are abutted against the inner wall of the compartment 64 in the air-tight manner for preventing air-leak between the shaft 50 and the tube 60. The slider 52 can be selectively blocked by the anti-detach ring 65 for preventing the shaft 50 detaching from the second end 602 of the tube 60. Additionally, the sleeve 58 is mounted on the second end 602 of the tube 60 which is inserted through the through-hole 581, and the threadedly coupled portion 54 defined on the sleeve 58 selectively engages with the threadedly connected portion 603. Then, the pusher 53 is selectively inserted into the first end 601 of the tube 60.

In this embodiment, the telescopic pump nozzle further includes a joint 70 which is coupled to the second end 502 of the shaft 50 and allows the shaft 50 firmly connecting to the air pipe 40. The joint 70 includes a first joint member 71 mounted on the second end 502, and a second joint member 72 engaged with the first joint member 71 and disposed opposite to the shaft 50.

The first joint member 71 includes a through-hole 711 where the second end 502 is inserted through, and an engaged end 712. The second joint member 72 includes a through-hole 721 where the second end 502 and the engaged end 712 are inserted through, an engaged portion 722 formed on an end thereof and engaged with the engaged end 712, and a clamping end 723 defined on another end thereof and adapted to clamp the air pipe 40. An anti-detach ring 59 is provided on a groove 56, which is formed on the second end 502 and is adjacent to the plug 55. The second end 502 can be blocked by the anti-detach ring 59 for preventing the shaft 50 detaching from the joint 70.

Figure 9:
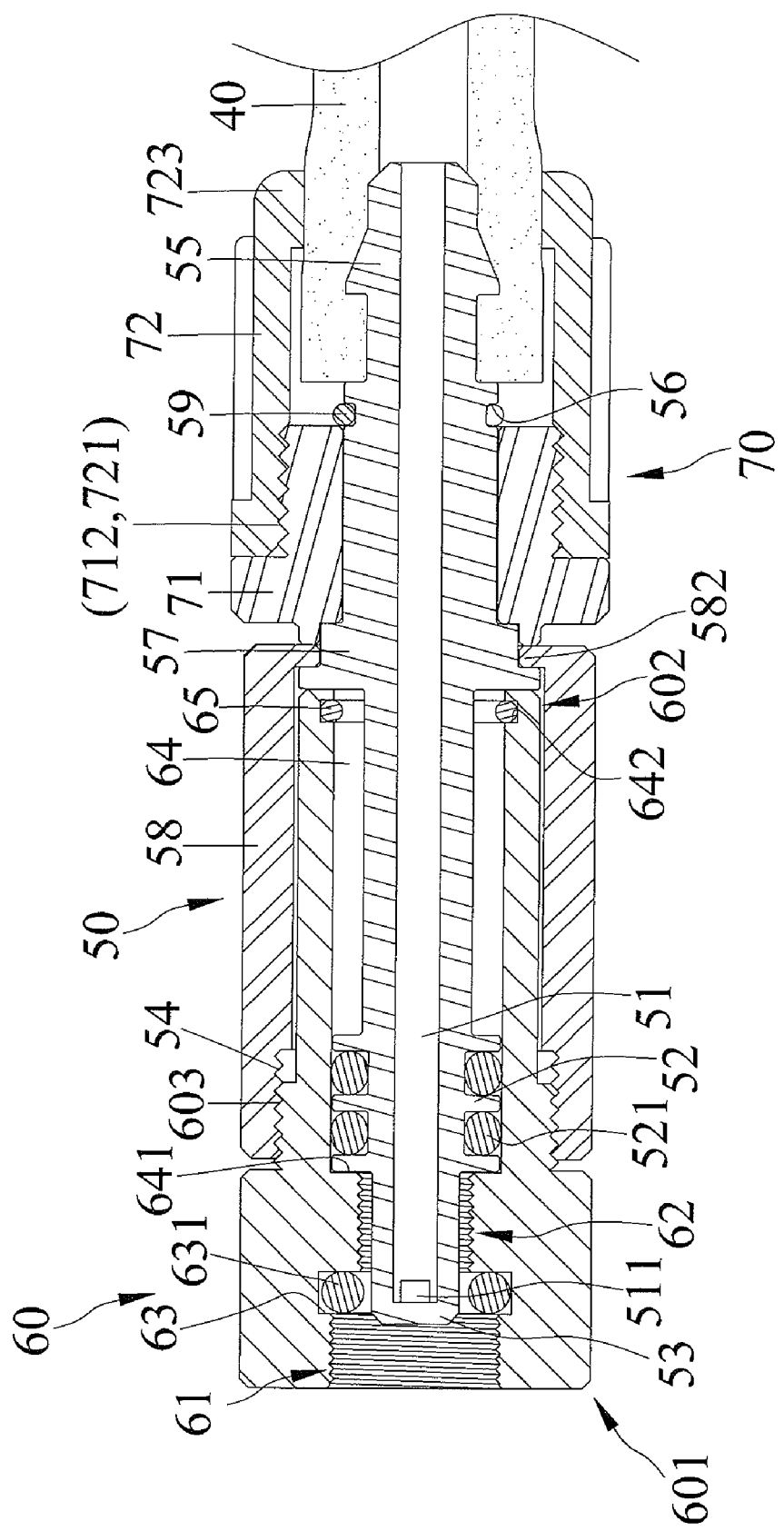
FIG. 9 is a cross-sectional view of the pump nozzle as shown in FIG. 7.
Figure 10:
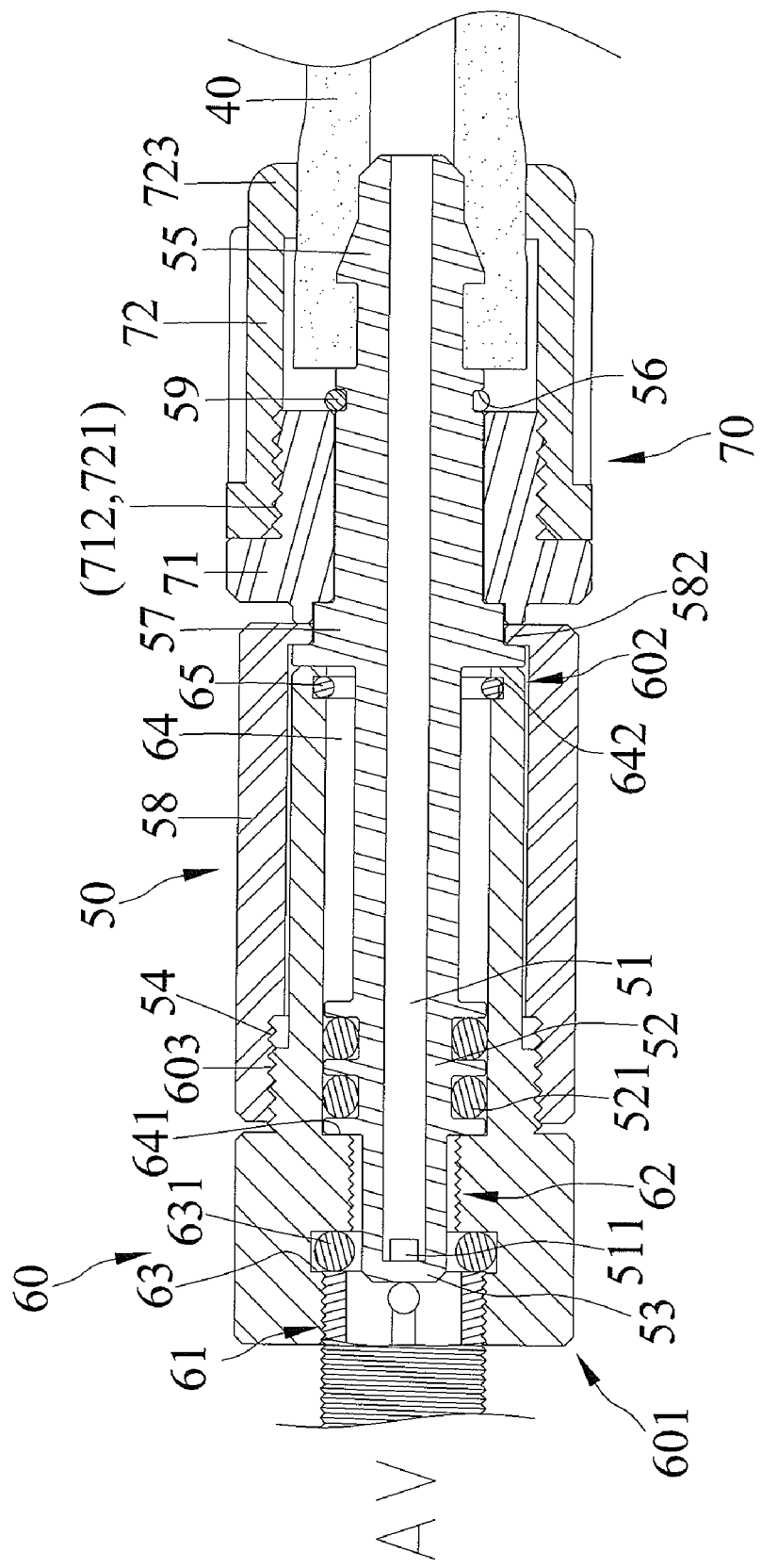
FIG. 10 is a cross-sectional view similar to FIG. 9, but illustrates the pump nozzle engaged with an American valve for inflating.

Referring to FIGS. 9 and 10, while the tube 60 is in a first position, the threadedly connected portion 603, which is defined on the outer periphery of the tube 60, is engaged with the threadedly coupled portion 54 and the blocked flange 641 blocks the slider 52. For inflating a tire with an American valve (as shown in FIG. 10), threads of the American valve are engaged with the first connected section 61 of the tube 60 firstly and the outer periphery of the American valve is abutted against the seal 631, and then the threadedly coupled portion 54 is engaged with the threadedly connected portion 603 by rotating the pump. Hence, the pusher 53 biases a needle of the American valve at the first connected section 61 and air can be pumped into the tire by the American valve through the through-hole 511 from the channel 51 which communicates with the air pipe 40.

Figure 11:
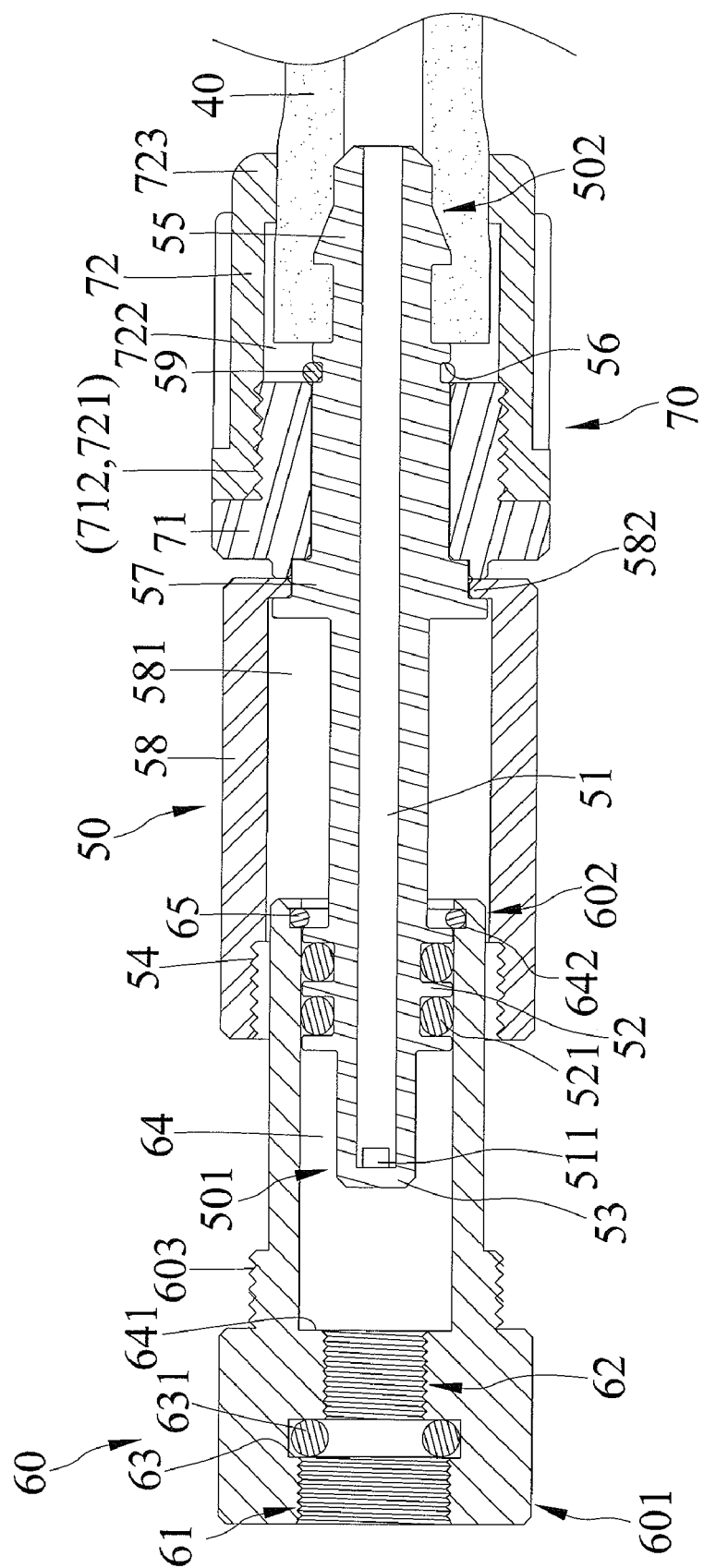
FIG. 11 is a cross-sectional view similar to FIG. 9, but illustrates the tube extended outward with respect to the shaft.
Figure 12:
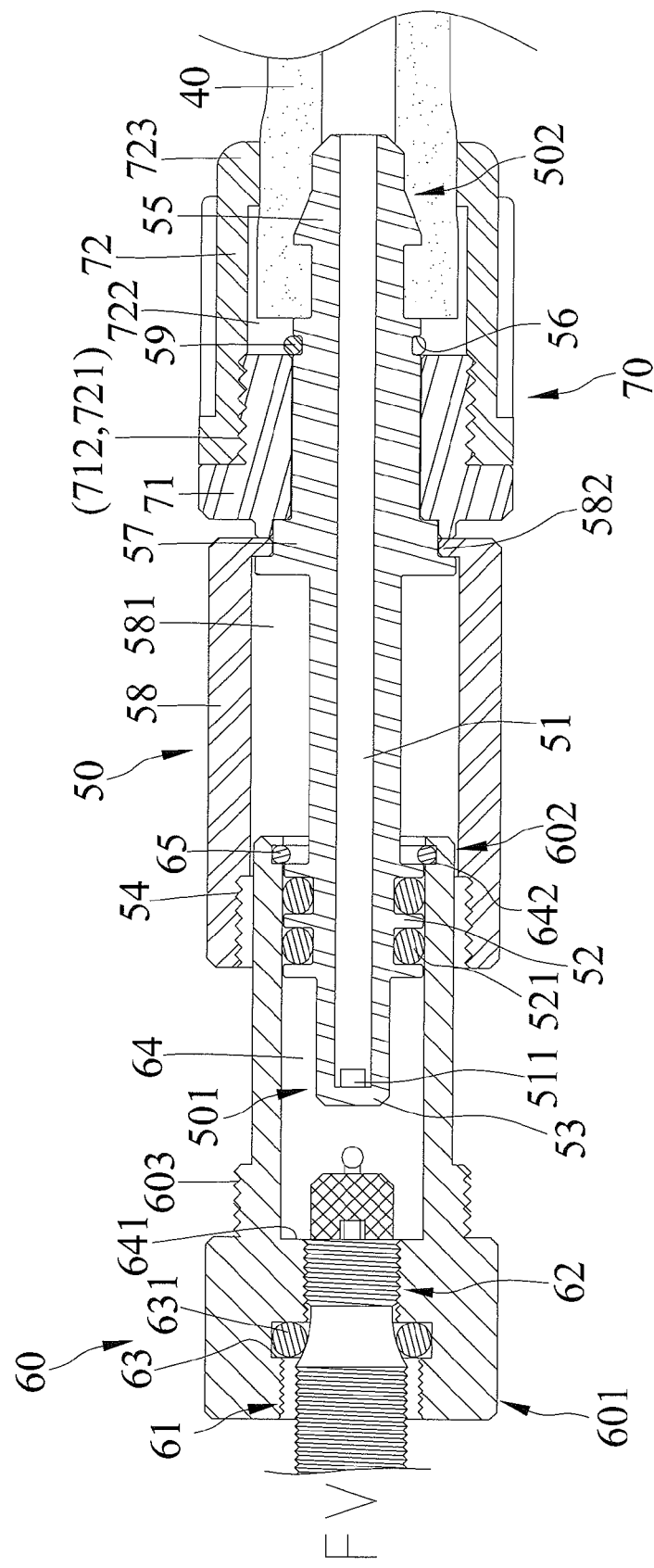
FIG. 12 is a cross-sectional view similar to FIG. 9, but illustrates the pump nozzle engaged with a French valve for inflating.

Referring to FIGS. 11 and 12, while the tube 60 is in a second position, threadedly connected portion 603 is disengaged from the threadedly coupled portion 54 and the second end 602 of the tube 60 is able to slide with respect to the sleeve 58 axially. The slider 52 can be blocked by the anti-detach ring 65. For inflating a tire with a French valve (as shown in FIG. 12), threads of the French valve are engaged with the second connected section 62 firstly and neck (not numbered) of the French valve is abutted against the seal 631 and is coupled to the first end 601 in the air-tight manner. Then, the pusher 53 biases a needle of the French valve at the first connected section 61 and air can be pumped into the tire by the French valve through the through-hole 511 from the channel 51 which communicates with the air pipe 40.

While the specific embodiments have been illustrated and described, numerous modifications come to mind without significantly departing from the spirit of invention, and the scope of invention is only limited by the scope of the accompanying claims.

What is claimed is:

1. A telescopic pump nozzle adapted for engaging with different tire valves for tire inflation, the pump nozzle comprising:
    a shaft, which has a first end and a second end, including a channel formed therein and communicating the first end with the second end, a slider formed on an outer periphery of the shaft and disposed between the first and second ends, a pusher defined at the top of the first end and disposed opposite to the second end and adapted to push needles of the tire valves for tire inflation, and a threadedly coupled portion defined at the first end, with the second end coupled to an air pipe of the pump; and
    a tube, which has a first end and a second end, including first and second connected sections formed on an inner wall of the first end, an annular section defined between the first and second connected sections, with the first connected section, the annular section and the second connected section contiguously formed on the inner side of the first end, a compartment defined in the second end, and at least one O-ring mounted on the shaft and abutted against the inner wall of the compartment in an air-tight manner, with the slider slideably disposed in the compartment, with the second connected section provided between the first connected section and the compartment, with the shaft slideably disposed in the compartment of the tube, with the threadedly coupled portion selectively coupled to the second connected section in a screwing manner;
    wherein a seal is provided at the annular section and is abutted against the tire valves in an air-tight manner when the tube is engaged with the threads of the tire valves; and wherein a blocked flange is formed in the tube between the compartment and the second connected section and blocking the slider;
    wherein a diameter of the second connected section is smaller than a diameter of the first connected section and a diameter of the compartment
    wherein the tube is able to be switched between a first position and a second position for selectively engaging with American and French valves for tire inflation; and wherein when the tube is in the first position, the threadedly coupled portion is engaged with a threadedly connected portion and the first connected section is engaged with threads of the American valve for tire inflation; and wherein when the tube is in the second position, the threadedly coupled portion is disengaged from the threadedly connected portion which is engaged with threads of French valve for tire inflation.

2. The telescopic pump nozzle as claimed in claim 1 further comprising a recess annularly formed on the inner wall of an end of the compartment and disposed opposite to the second connected section, and an anti-detach ring provided at the recess and blocking the slider.

3. The telescopic pump nozzle as claimed in claim 1, wherein the shaft includes a blocked flange provided on an outer periphery thereof and disposed between the first and second ends, and a sleeve mounted on the shaft and extending from the blocked flange toward the first end.

4. The telescopic pump nozzle as claimed in claim 3, wherein the sleeve includes a through-hole the shaft is inserted, and a clamping end defined on a first end thereof and blocking the blocked flange for coupling the sleeve to the shaft, with the threadedly coupled portion formed on the inner wall of a second end of the sleeve opposite to the clamping end with respect to the pusher.

5. The telescopic pump nozzle as claimed in claim 1, wherein a diameter of the first end is larger than a diameter of the second end, with the threadedly connected portion defined on an outer periphery of a connection of the first and second ends.

6. The telescopic pump nozzle as claimed in claim 1 further comprising a joint coupled to the second end of the shaft and allows the shaft firmly connecting to the air pipe, with the joint including a first joint member mounted on the second end and a second joint member engaged with the first joint member opposite to the shaft.

7. The telescopic pump nozzle as claimed in claim 6, wherein the first joint member includes a through-hole the second end inserts therethrough, and an engaged end, and wherein the second joint member includes a through-hole the second end and the engaged end inserted therethrough, an engaged portion formed on a first end thereof and engaged with the engaged end, and a clamping end defined on a second end thereof and adapted to clamp the air pipe, and wherein an anti-detach ring is provided on a groove formed on the second end and is adjacent to the plug and prevents the shaft detaching from the joint.

8. The telescopic pump nozzle as claimed in claim 1 further comprising two O-rings mounted on the slider and abutted against the inner wall of the compartment.

9. The telescopic pump nozzle as claimed in claim 1, wherein the annular section is concave.

10. The telescopic pump nozzle as claimed in claim 2, wherein the shaft includes a blocked flange provided on an outer periphery thereof and disposed between the first and second ends, and a sleeve mounted on the shaft and extending from the blocked flange toward the first end.

11. The telescopic pump nozzle as claimed in claim 10, wherein the sleeve includes a through-hole the shaft is inserted, and a clamping end defined on a first end thereof and blocking the blocked flange for coupling the sleeve to the shaft, with the threadedly coupled portion formed on the inner wall of a second end of the sleeve opposite to the clamping end with respect to the pusher.

12. The telescopic pump nozzle as claimed in claim 3, wherein a diameter of the first end is larger than a diameter of the second end, with the threadedly connected portion defined on an outer periphery of a connection of the first and second ends.

13. The telescopic pump nozzle as claimed in claim 4, wherein a diameter of the first end is larger than a diameter of the second end, with the threadedly connected portion defined on an outer periphery of a connection of the first and second ends.

14. The telescopic pump nozzle as claimed in claim 3 further comprising a joint coupled to the second end of the shaft and allows the shaft firmly connecting to the air pipe, with the joint including a first joint member mounted on the second end and a second joint member engaged with the first joint member opposite to the shaft.

15. The telescopic pump nozzle as claimed in claim 5 further comprising a joint coupled to the second end of the shaft and allows the shaft firmly connecting to the air pipe, with the joint including a first joint member mounted on the second end and a second joint member engaged with the first joint member opposite to the shaft.

* * * * *